Nov. 10, 1925.    1,561,351
F. J. NIELSEN
FISH BASKET
Filed Feb. 18, 1924
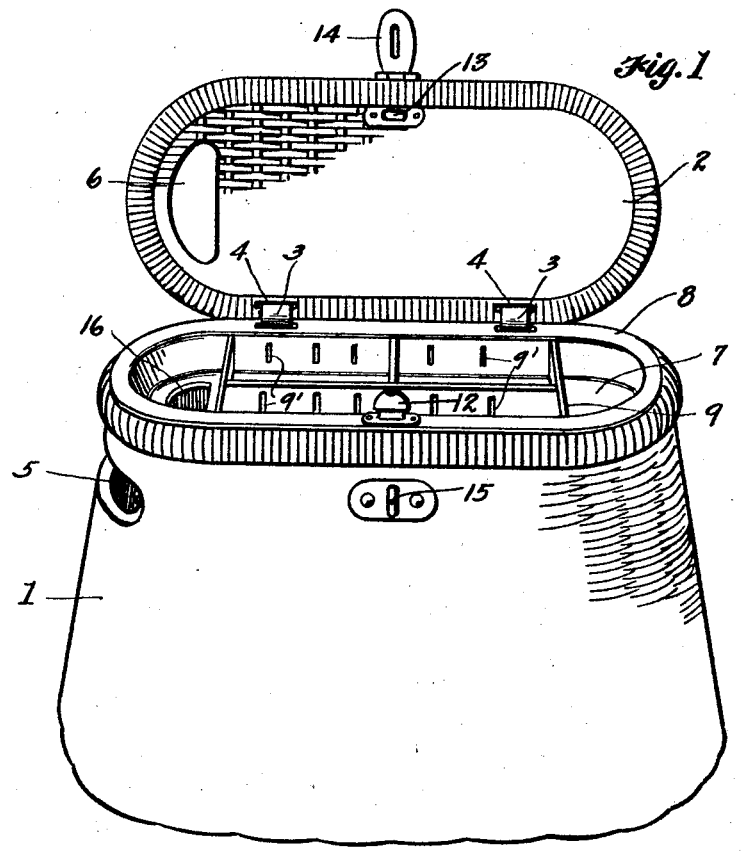
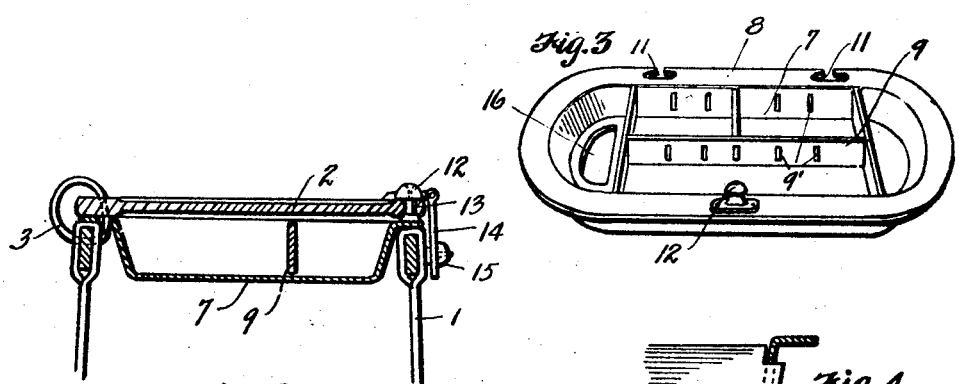
INVENTOR
FRED J. NIELSEN
BY
Richard J. Cook
ATTORNEY Patented Nov. 10, 1925.

1,561,351

UNITED STATES PATENT OFFICE.

FREDERICK J. NIELSEN, OF SEATTLE, WASHINGTON.

FISH BASKET.

Application filed February 18, 1924. Serial No. 693,502.

*To all whom it may concern:*

Be it known that I, FREDERICK J. NIELSEN, a citizen of the United States, and a resident of Seattle, King County, Washington, have invented certain new and useful Improvements in Fish Baskets, of which the following is a specification.

This invention relates to improvements in game baskets; and more particularly to fish baskets of that type carried by fishermen while fishing and into which the fish are placed as they are removed from the hook.

The most common types of fish baskets now used make no provision for the carrying therein of such articles as hooks, leaders, bait, etc., and since these are very essential to the equipment of a fisherman he must carry them in a separate receptacle or in his pocket, which, in most cases, is not easily accessible or convenient to reach when most needed.

In view of the above, it has been the object of this invention to provide a fish basket that is equipped with a tray in which bait, line, leaders, hooks, etc. can be carried, and which is so arranged that access thereto can be had by lifting the cover or lid of the basket and which is also equipped with means whereby it may be attached to the cover and lifted therewith to give access to the basket without necessitating the lifting of both the cover and tray separately.

A further object resides in the provision of an opening through the tray in registration with an opening in the cover, through which fish may be put into the basket.

Other objects reside in the various details of construction and combination of parts embodied in the invention as will hereinafter be described and finally pointed out in the claims terminating the same.

In accomplishing these and other objects of the invention, I have provided the improved details of construction, the preferred forms of which are illustrated in the accompanying drawings, wherein—

Figure 1 is a perspective view of a fish basket equipped with a tray in accordance with the present invention.

Figure 2 is a transverse, sectional detail, illustrating the manner of mounting the tray and its attachment to the cover.

Figure 3 is a perspective view of the tray removed from the basket.

Figure 4 is a detail, sectional view of a part of the tray.

Referring more in detail to the drawings—

1 designates a fish basket which may be of the usual form of construction, the top of which is adapted to be closed by means of a lid, or cover, 2 that is hingedly attached to the basket by means of two rings 3 that extend through the rim of the basket and through slots 4 in the cover. In one end of the basket is an opening 5 and also in the cover is an opening 6 through which fish may be put into the basket.

Fitted within the top opening of the basket is a tray 7 having a flat, peripheral flange 8 seated upon the basket rim. This tray preferably would be made of aluminum, or a similar metal, and is divided into compartments by partitions 9. To provide for re-arrangement of the partition walls, the side walls of the tray could be provided with vertical slits, as at 9', and the ends of the partitions equipped with end extensions 10 adapted to seat within the slits and to thus hold the partitions to form compartments of different size according to what is desired to place in them.

The rear flange 8 of the tray is provided with open T-shaped slots 11 adapted to receive the rings 3 to thereby hingedly attach the tray to the basket and at the front of the tray is a rotatably attached flat button 12 adapted to be extended through a slot 13 in the cover and, when turned crossways of the slot, to hold the tray in locked connection with the cover. The cover also is equipped with a hasp 14 adapted to be applied over a button 15 fixed to the front of the basket to hold the cover closed.

Within one end of the tray there is an opening 16 which registers with the cover opening 6 and through which fish may be put into the basket without necessitating the lifting of the cover and tray.

In using the device the tray is normally locked by means of the button 12 to the cover. If it is desired to have access to the tray, the button 12 is released and the cover raised. If it should be desired to have access to the basket, the button 12 is kept locked and the tray will then be raised with the cover.

This arrangement provides a convenient and easily accessible container for bait, lines, hooks, etc., and does not to any appreciable extent, decrease the capacity of the basket, or interfere with the placing of fish in the basket through opening 6.

Having thus described my invention, what I claim as new therein and desire to secure by Letters-Patent, is:

1. In combination, with a fish basket having a hingedly mounted cover and an opening therein for the reception of fish, a detachable tray disposed within said basket beneath the cover with an opening therethrough in registration with the cover opening, said tray having a peripheral flange to seat upon the edge of the basket and provided with slots adapted to detachably receive the hinge of said cover.

2. A detachable tray for fish baskets, comprising a plurality of slits in the side walls thereof, partitions having extensions adapted to seat within said slits to form compartments of different sizes, an opening in the bottom of said tray, a peripheral flange around the upper marginal edge of said tray to seat upon the basket rim and having T-shaped slots adapted to detachably engage the hinges of the basket cover.

Signed at Everett, Snohomish County, Washington this 19th day of January, 1924.

FRED. J. NIELSEN.